(12) United States Patent
Chiaves

(10) Patent No.: US 10,006,667 B2
(45) Date of Patent: Jun. 26, 2018

(54) STRUCTURE OF A CONCENTRATOR MIRROR FOR CONCENTRATING SOLAR ENERGY

(71) Applicant: Paolo Chiaves, Turin (IT)

(72) Inventor: Paolo Chiaves, Turin (IT)

( * ) Notice: Subject to any disclaimer, the term of this patent is extended or adjusted under 35 U.S.C. 154(b) by 194 days.

(21) Appl. No.: 14/906,417

(22) PCT Filed: Jul. 23, 2014

(86) PCT No.: PCT/EP2014/002009
§ 371 (c)(1),
(2) Date: Jan. 20, 2016

(87) PCT Pub. No.: WO2015/010785
PCT Pub. Date: Jan. 29, 2015

(65) Prior Publication Data
US 2016/0153683 A1    Jun. 2, 2016

(30) Foreign Application Priority Data

Jul. 23, 2013    (IT) .............................. TO2013A0621

(51) Int. Cl.
*F24J 2/10*    (2006.01)
*F24J 2/54*    (2006.01)
*F24J 2/46*    (2006.01)

(52) U.S. Cl.
CPC ........... *F24J 2/5403* (2013.01); *F24J 2/1057* (2013.01); *F24J 2/541* (2013.01); *F24J 2002/4687* (2013.01); *F24J 2002/5441* (2013.01); *F24J 2002/5486* (2013.01); *F24J 2002/5493* (2013.01); *Y02E 10/47* (2013.01)

(58) Field of Classification Search
CPC ................... F24J 2/062; F24J 2/12; F24J 2/38
See application file for complete search history.

(56) References Cited

U.S. PATENT DOCUMENTS 4,263,893 A * 4/1981 Pavlak ..................... F24J 2/145
126/570
4,299,445 A * 11/1981 Aucouturier ............... F24J 2/10
359/846

(Continued)

FOREIGN PATENT DOCUMENTS

WO    WO2013057325    4/2013    .............. B60L 11/18

OTHER PUBLICATIONS

International Search Report and Written Opinion issued in application No. PCT/EP2014/002009, dated Oct. 7, 2014 (11 pgs).

*Primary Examiner* — Avinash Savani
*Assistant Examiner* — Deepak Deean
(74) *Attorney, Agent, or Firm* — Hayes Soloway P.C.

(57) ABSTRACT

The structure of a concentrator mirror includes a prefabricated body of reinforced concrete, which includes a panel member having a front surface with a reflective laminar layer, and a back surface, between which a hinge axis for the rotation of the panel is defined. A pair of coaxial hollow seats are formed in the body at respective longitudinally spaced positions, to define the hinge axis together with respective spherical joints. The body includes a rib shaped counterweight appendage extending parallel to the hinge axis from the back surface of the panel member, on the side opposite the front surface, so as to bring the hinge axis in a barycentric position of the body.

17 Claims, 6 Drawing Sheets

(56) References Cited

U.S. PATENT DOCUMENTS

| | | | | |
|---|---|---|---|---|
| 4,325,360 | A | * | 4/1982 | Kelley .................... F24J 2/1047 126/651 |
| 4,602,853 | A | * | 7/1986 | Barr ........................ F24J 2/045 126/688 |
| 4,853,283 | A | * | 8/1989 | Skolnick ............... B44C 1/1716 428/335 |
| 5,069,540 | A | * | 12/1991 | Gonder .................. F24J 2/1057 126/651 |
| 6,988,809 | B2 | * | 1/2006 | Rabinowitz ................ F24J 2/10 359/851 |
| 8,764,207 | B2 | * | 7/2014 | Neff ....................... F24J 2/1057 126/684 |
| 2004/0011355 | A1 | * | 1/2004 | Reiala .................... B01J 19/127 126/698 |
| 2008/0163921 | A1 | | 7/2008 | Leong et al. ................. 136/246 |
| 2009/0133689 | A1 | | 5/2009 | Conchy et al. ............... 126/684 |
| 2009/0188487 | A1 | | 7/2009 | Jones et al. .................... 126/600 |
| 2012/0228883 | A1 | * | 9/2012 | Cwik ........................ F24J 2/15 290/1 R |
| 2013/0000693 | A1 | * | 1/2013 | Waterhouse ........... F24J 2/5233 136/246 |
| 2014/0246903 | A1 | * | 9/2014 | Romeo .................... F24J 2/541 307/11 |

\* cited by examiner

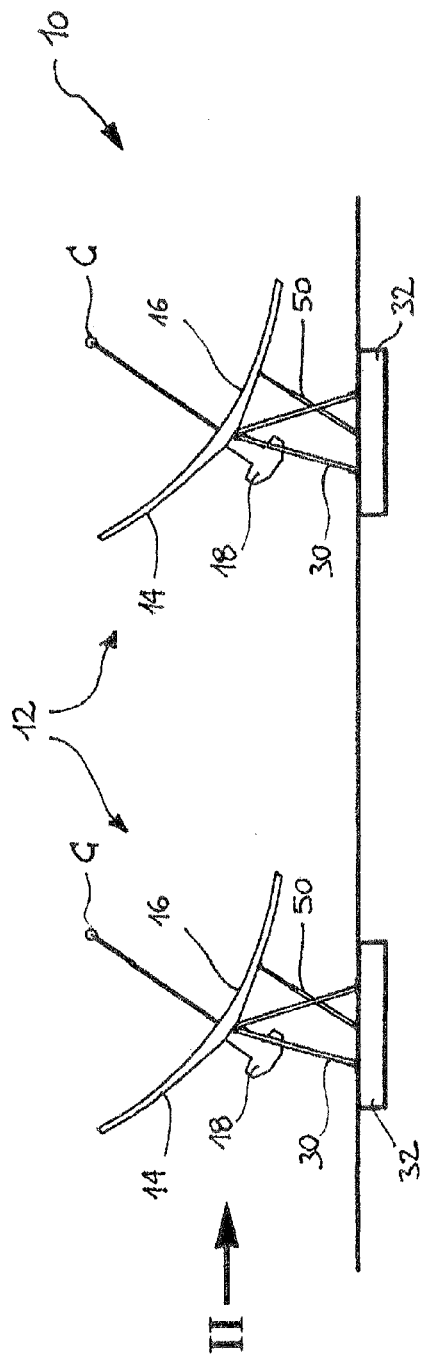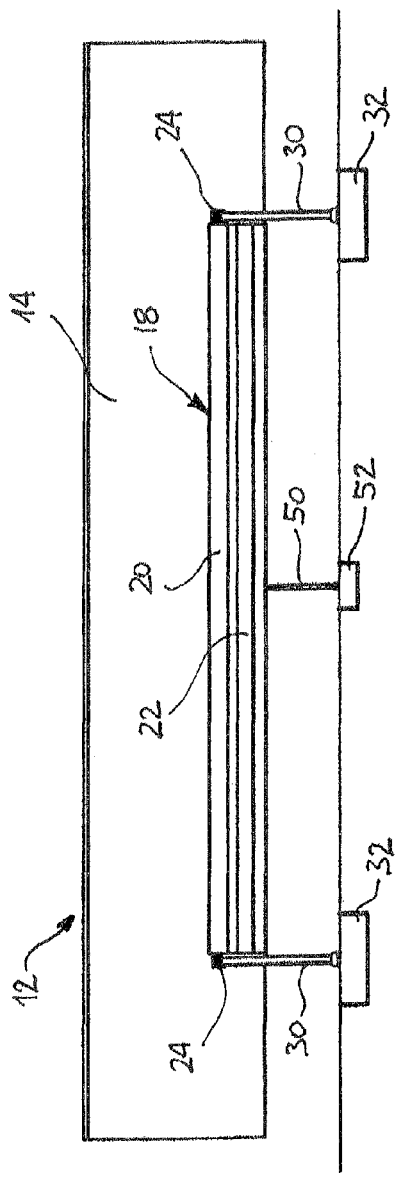

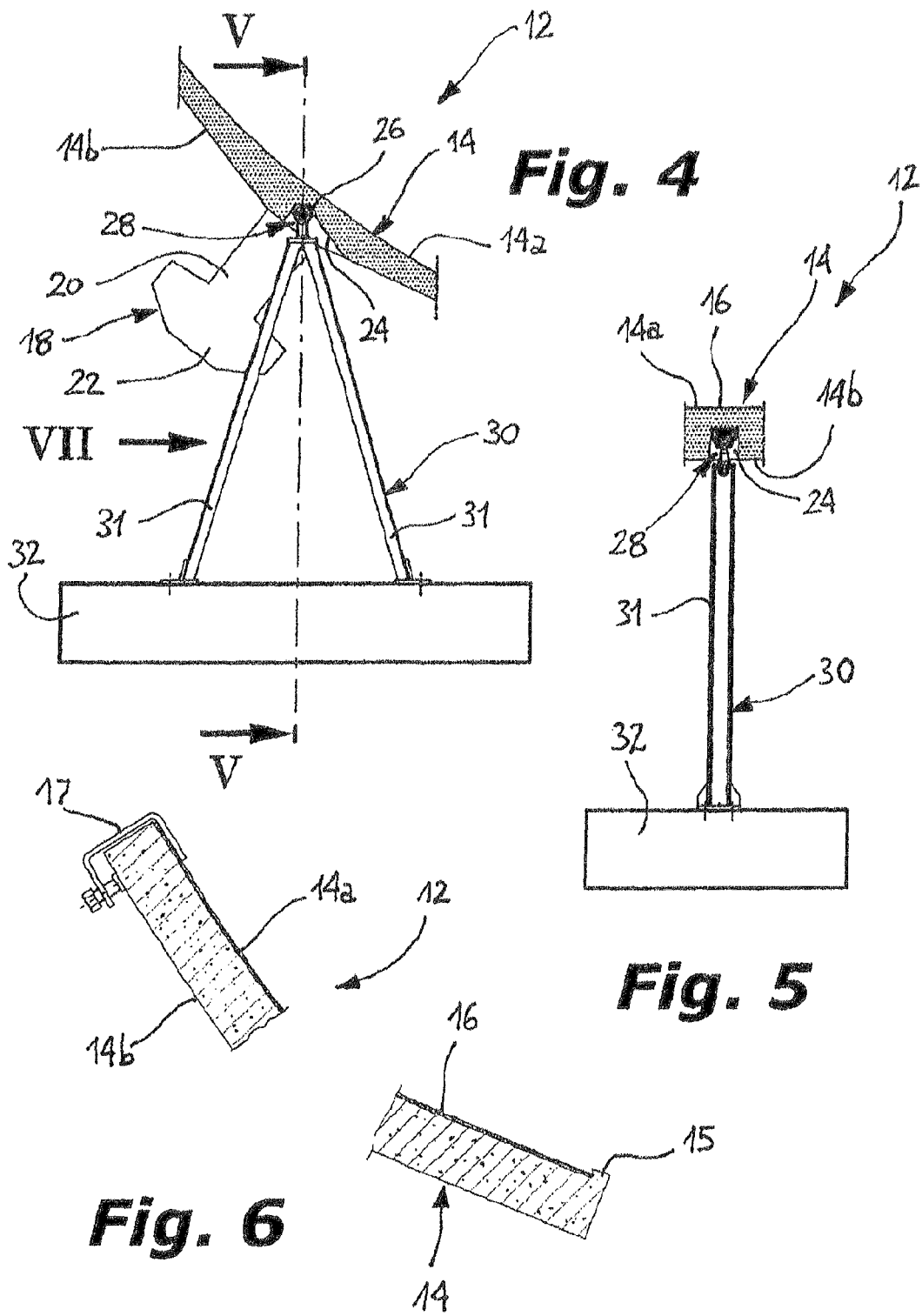

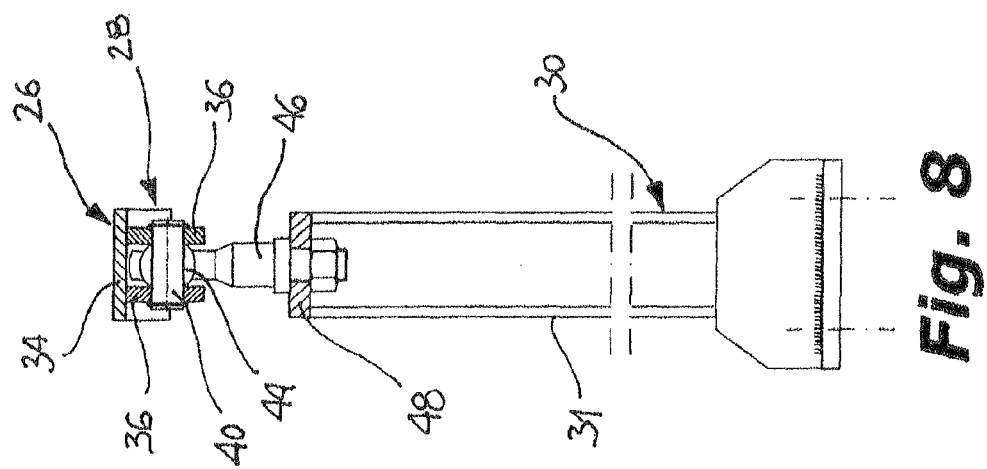
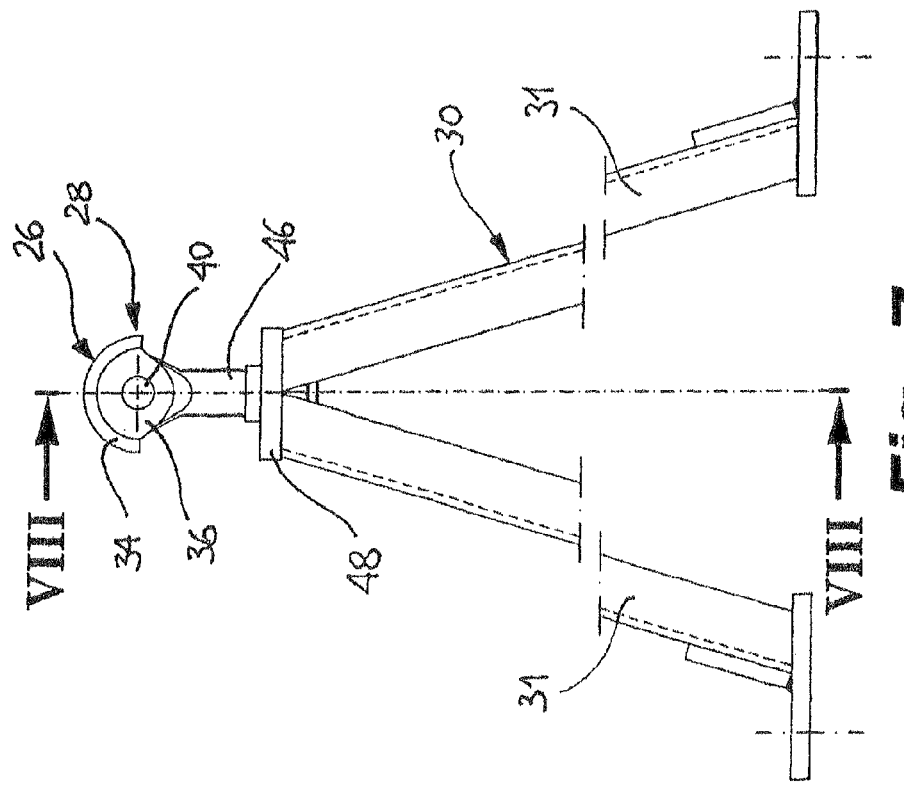

STRUCTURE OF A CONCENTRATOR MIRROR FOR CONCENTRATING SOLAR ENERGY

BACKGROUND OF THE INVENTION

The present invention relates in general to plants for electric power generation or for heat accumulation, which use solar radiation as an energy source. These plants include, in a manner known per se, a plurality of mirrors that allow the solar radiation to be concentrated towards a predetermined reception zone.

It is well known that the cost of energy generated from solar radiation is mainly due to manufacturing cost of the plants itself and their components. Therefore, in order to obtain energy at a low cost, it is critical to hold down manufacturing costs of these plants. Especially in large plants, it is convenient to limit as much as possible manufacturing, installation and maintenance costs of the concentrator mirrors, which constitute their main elements.

More particularly, the invention relates to a structure of a concentrator mirror.

Such a structure is generally known from U.S. Pat. No. 5,069,540 that describes a mirror for concentrating solar energy comprising an elongated panel member having a hollow structure which is delimited, on opposite sides, by generally curved front and back surfaces. The panel member is associated with a beam member, preferably having a tubular shape, which defines a hinge axis for rotation of the mirror, which hinge axis can be interposed between the front surface and the back surface of the panel member. The structure of this mirror is relatively complex to be manufactured, and expensive.

SUMMARY OF THE INVENTION

The main purpose of the invention is to provide a concentrator mirror structure which is simple and inexpensive to be manufactured, having a great durability, requiring a low maintenance, allowing the time of installation of the mirror to be reduced in order to minimize manufacturing time of relevant plant compared to that required for the plants known so far, and in which rotation needed to direct it with respect to the Sun requires relatively small forces.

By virtue of the fact that the mirror body has a pair of longitudinally spaced coaxial hollow seats, intended to receive respective support ball joints defining said hinge axis, and of the fact that said body comprises a generally rib-shaped counterweight appendage extending from the back surface of the panel member in the direction opposite to its front surface and parallel to said hinge axis, with the aim of bringing the hinge axis into a barycentric position of the body, it is possible to make a concentrator mirror having a simple structure and, therefore, inexpensive to be manufactured, the shape of which is relatively compact so that it can be carried by trucks the size of which fall within the shape allowed for road transportation.

Moreover, the structure of a mirror according to the invention can be installed in a simple manner and quickly, without requiring special installation equipment or special skills by the operators, and it requires small forces to be moved.

The structure of the invention is adapted to make both flat and curved mirrors, and in particular it is suitable to make parabolic mirrors of the so-called "tracking" type, that is movable concentrator mirrors having an automatically controlled motion, to allow the Sun to be tracked during its apparent motion.

This structure can be used to make mirror systems according to two different arrangements. According to a first arrangement, each mirror supports a respective receiver pipe arranged at the geometric focus of the mirror, which rotates integrally with it to follow the apparent motion of the Sun. According to a second arrangement, two or more mirrors are operatively associated with a single fixed receiver pipe, on which the rays of the Sun are concentrated. This second arrangement is not optimal from the geometrical optics point of view, since the rays reflected can not be focused in an exactly precise manner on a fixed receiver pipe, so that the problem of concentrating the rays reflected by more mirrors on a single fixed receiver pipe has not an exact solution. However, since the focusing error is small, in practice this solution is effective and efficient. In fact, in spite of the fact the all solar rays do not converge exactly on a single line (as it happens instead if the receiver pipe is arranged at the geometric focus of the mirror and rotates integrally with it), they can be concentrated on a strip having a very small width (which may change depending on the orientation of the Sun) of the surface of the receiver pipe which in its turn has a non-zero width. Therefore, by using an arrangement in which the area on which the rays converge is less wide than the working area of the receiver pipe, the rays reflected by the mirrors are directed entirely or almost entirely to the receiver pipe, with the advantage that the concentration ratio of the reflected rays can be increased compared to the case of a single receiver tube for each mirror, on equal terms of the extension of the mirrors.

According to a first advantageous aspect of the invention, the rib extends from the back surface of the panel member, and it is possibly provided with an elongated ballast counterweight. In this manner, the appendage can be made in order to have a relatively compact shape to facilitate transportation of a plurality of structures on a truck having conventional size.

According to another advantageous aspect of the invention, each seat of said pair of coaxial seats has a semicircular shaped bottom surface prepared to allow the respective support members to be engaged in them, by coupling. This shape of the seats allows the assembly operation to be made quick and practical, by simply coupling the support members in the respective seats, so that installation of the structure is facilitated.

BRIEF DESCRIPTION OF THE DRAWINGS

Further characteristics and advantages of the invention will become more evident from the following detailed description, given by way of a non-limiting example and referred to the accompanying drawings in which:

FIG. 1 is a schematic side elevational view of a part of a solar plant including a series of structures according to the invention, FIG. 2 is a rear elevational view of a structure according to the invention, from the side of arrow II of FIG. 1, FIGS. 3a and 3b are similar side elevational schematic views showing two different operative positions of a structure according to the invention, FIG. 4 is a fragmentary and partially sectioned side elevational view showing a support member of the structure of the invention, FIG. 5 is a rear elevational view sectioned along line V-V of FIG. 4, FIG. 6 is a fragmentary sectional side elevational view showing a mode of application of a reflective layer on the structure according to the invention, FIG. 7 is an enlarged side elevational view of a support member of the structure of the invention in its assembled configuration, indicated by arrow VII of FIG. 4, FIG. 8 is a rear elevational view sectioned along line VIII-VIII of FIG. 7.

DETAILED DESCRIPTION OF THE DRAWINGS

Figure 3A:
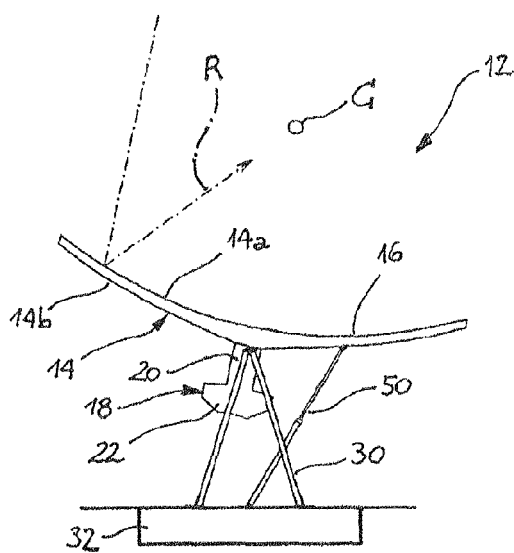

With initial reference to FIG. 1, a plant 10 for generating energy or for heat accumulation from solar radiation, includes a plurality of prefabricated bodies 12, of conventional or pre-stressed reinforced concrete, which are equal to each other and are typically arranged according to one or more arrays, each of which allows a movable concentrator mirror to be made.

Each prefabricated body 12 includes a panel member 14 having an elongated shape, typically rectangular in a plan view, the cross section of which can be flat or curved, and typically has a parabolic shape.

A reflective laminar layer 16 is associated with the panel member 14 of each mirror 12, in order to reflect the incident solar radiation R towards a duct C within which a fluid to be heated flows.

Figure 3B:
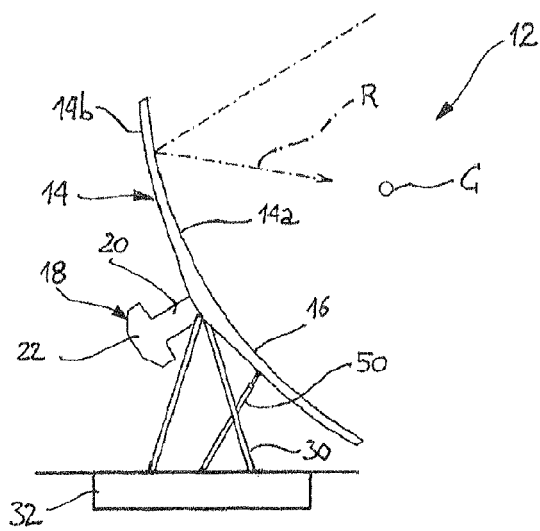
Figures 9, 10:
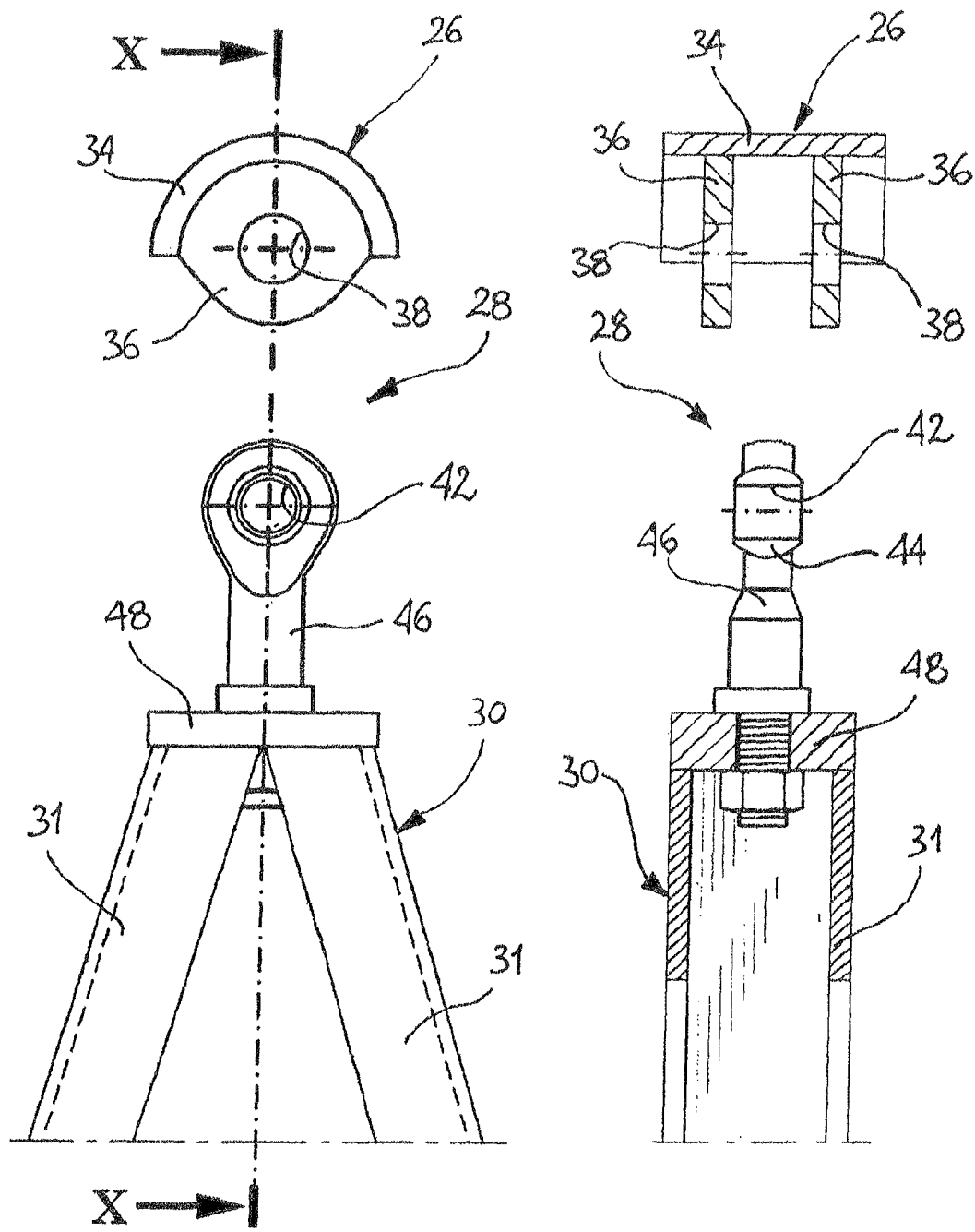
FIG. 9 is an enlarged and exploded view of the support element of FIG. 7.
FIG. 10 is a rear elevational view sectioned along line X-X of FIG. 9, and FIGS. 11a and 11b are two views similar to those of FIGS. 3a and 3b, showing two different operative positions of a modification of the structure of the invention, which comprise a plurality of mirrors for each receiver pipe.

According to a first modification of the invention shown particularly in FIGS. 1, 3a and 3b, a duct C, so-called "receiver pipe", is fixed to a respective mirror 12 in a position corresponding to the geometric focus of the mirror 12, so that the duct C rotates together with the respective mirror when tracking the apparent motion of the Sun.

Figure 11A:
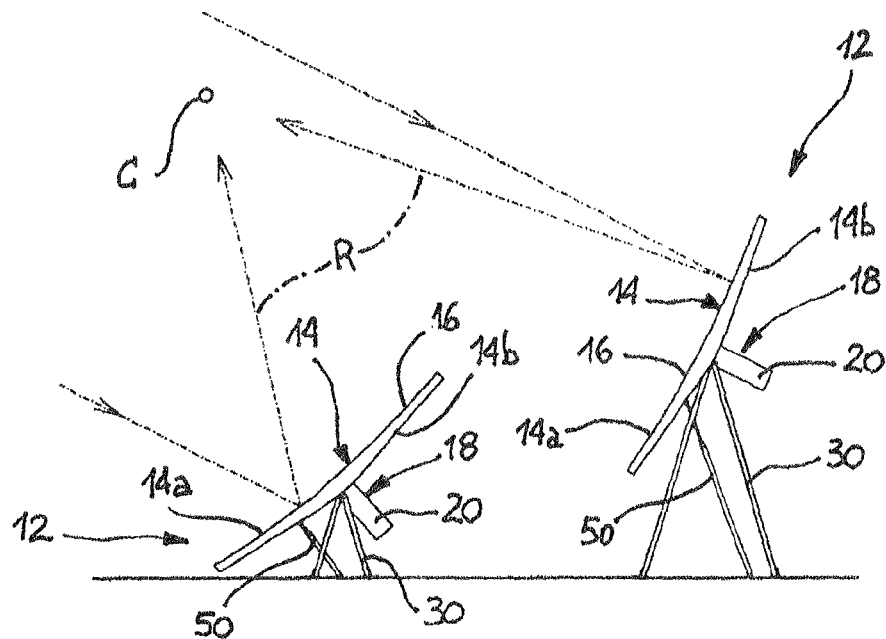
Figure 11B:
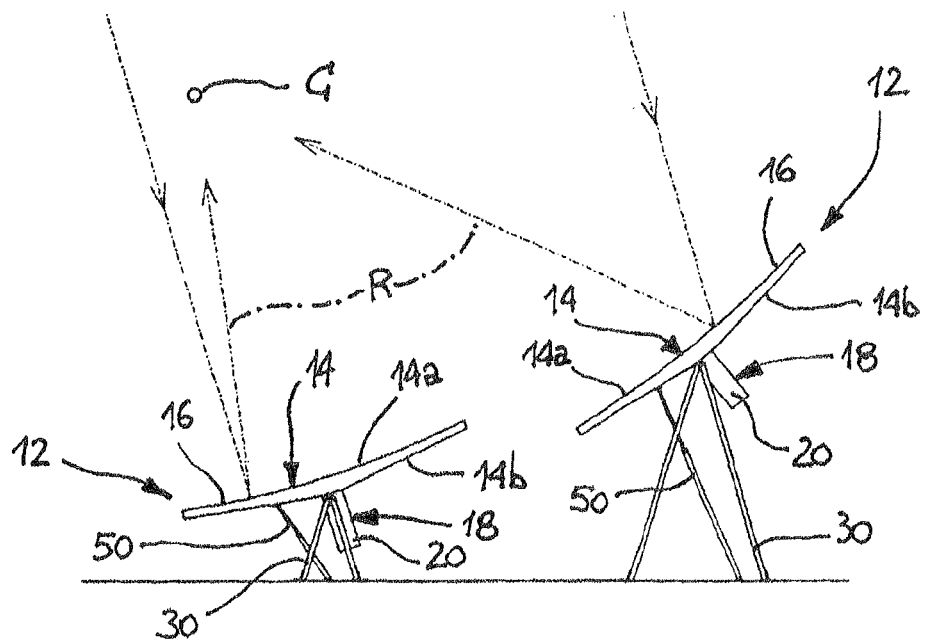

According to another modification shown in FIGS. 11a and 11b, a duct C is operatively associated to more mirrors 12. In this case, the duct C, or "receiver pipe", is mounted in a fixed position with respect to the ground, and the movement of the various mirrors 12 associated with it, is controlled in such a manner that the solar rays reflected by them are concentrated on the duct C. Although it is not usually possible to concentrate exactly the rays reflected simultaneously from more mirrors 12, while they are rotating, on one line, the movement of the various mirrors 12 can be controlled to concentrate the reflected solar radiation on a strip zone on the surface of the duct C, the width of which is less than the diameter or thickness of such a duct, with the advantage that, for a given size of the mirrors 12, the concentration ratio of the solar rays on the duct C can be increased.

Each prefabricated body 12, in the installed condition and during use of the relevant mirror, in a manner known per se, is subject to an automatically controlled motion as a result of the instantaneous position of the Sun.

In the most frequent case shown in the figures, in which the panel member 14 of the body 12 has a curved, typically parabolic, shape, it is delimited by a substantially concave front surface 14a to which the reflective layer 16 is associated, and by an opposite and convex back surface 14b.

The laminar reflective layer 16 can be made by a coating layer containing reflective pigments, spray applied on the surface 14a of the body 12, or by one or more reflective sheets, for example of aluminum or of a polymeric reflective material, superimposed on the surface 14a.

When the layer 16 consists of a single reflective sheet, it can be connected to the front surface 14a of the body 12 by an adhesive material, or it can be incorporated in the front surface 14a at the time of formation of the body 12. Such a single reflective sheet may be conveniently provided with a transparent protective film applied on its outer side.

As an alternative, the reflective layer 16 may comprise a series of reflective sheets superimposed and separable to each other, so that its reflective surface can be periodically renewed by removing from time to time the outermost layer.

Preferably, the reflective layer 16 is applied on the front surface 14a in a removable manner. For this purpose, the body 12 has a projection 15 along an axial side thereof, which constitutes a resting abutment for a corresponding edge of the laminar layer 16. Conveniently, the projection 15 has a undercut shape to hold the respective edge of the laminar layer 16, while the opposite side of the layer 16 is fixed at the other side of the body 12 by a series of clamps 17 each of which comprises a screw fastening member one end of which rests against an area of the back surface 14b of the member 14.

Each prefabricated body 12 also includes an appendage 18 having the function of a counterweight, which is substantially shaped as a rib 20, arranged centrally with respect to the back surface 14b of the panel member 14 along a direction parallel to the general axis of the body 12, and facing the side opposite to the front surface 14a.

In particular, the rib 20 has a flank rigidly connected to the back surface 14b, and preferably its length is a little less than that of the panel member 14, so that a pair of spaces are formed between each axial end of the rib 20 and the respective ends of the member 14. Moreover, the rib 20, at its end opposite to the panel member 14, may be provided with a ballast counterweight 22 the cross section of which is enlarged with respect to that of the rib 20.

Preferably, the appendage 18 is integral with the prefabricated body 12, being formed by a single cast together with the panel member 14.

In a case of practical implementation, the length of the panel member 14 is between 6 and 15 m, preferably about 12 m, and its width is between 2 and 6 m, preferably about 3 m. The rectangular shape of the panel 14, having the size mentioned above, allows the loading capacity of the flatbed of a transportation truck to be optimally exploited, and to respect the shape allowed for road transportation.

Conveniently, the appendage 18 extends over the back surface 14b of each body 12 on a length generally between ⅙ and ¼ of the chord of the panel member 14, that is the distance between the opposite sides of the front surface 14a of such a panel member 14.

In the space between the axial ends of the rib 20 and the corresponding ends of the panel 14, respective hollow seats 24 are formed for positioning the support members 30 of the body 12. These seats 24, which are axially spaced along the prefabricated body 12, allow to define, together with the respective ball joints (described in greater detail below), a hinge axis of the body 12, about which the body can rotate with respect to the support members 30. In particular, this hinge axis is arranged at a barycentric position of the body 12, between the front and back surfaces 14a, 14b of the panel member 14.

Conveniently, each hollow seat 24 has a bottom semicircular shaped surface. The two seats 24 of each prefabricated body 12 also have a non-symmetrical shape with respect to a central axis, perpendicular to the general plane of the body 12, but symmetrical with respect to an inclined axis, for example of about 45°, with respect to said perpendicular axis, depending on the latitude of the site of the plant 10 of which the body 12 is part.

Each of the seats 24 is intended to receive a head 26 of an articulated joint 28 supported by a respective support member 30 fixed on a relevant foundation 32 formed on the resting plane of the mirror structure, by anchors of a type known per se. Preferably, each support member 30 comprises a pair of legs 31 arranged according to a divergent or V-shaped configuration, each of which conveniently consists of a rectilinear profiled section, for example metallic, having a U shaped cross section.

Each head 26 consists of a shell portion 34 having a semicircular shape, from which a pair of parallel flanges 36 extend, provided with coaxial holes 38. A pin is inserted in such holes 38, which is arranged coaxially to a spherical joint 42, 44, fixed by a screw/nut-screw coupling via an upright 46 on a plate 48 connected at the vertex of each support member 30.

Moreover, at an intermediate position between the two seats 24, but offset with respect to the hinge axis, the body 12 is provided with an engagement formation (not shown in detail in the figures) to allow the articulated connection of a first end of a linear actuator 50. By virtue of the remotely controlled extension or contraction of the actuator 50, the body 12 can be properly oriented depending on the position of the Sun. The second end of the actuator 50 is articulably connected to a foundation 52 formed on the resting plane of the mirror structure.

A fluid actuator, such as a hydraulic cylinder, or an actuator provided with a moving device of the rack/worm-screw type, can be used as the actuator 50. The latter actuator type facilitates reaching of a fine adjustment of the position of the body 12 of each concentrator mirror.

Upon installation of a prefabricated body 12 on a pair of support members 30 already fixed on a respective foundations 32, it is sufficient to lift the body 12 and to position it in such a manner that the heads 26 of the two support elements 30 engage the respective seats 24 of the body 12. In this manner, a coupling between the seats 24 and the respective heads 26 of the ball joints is reached, which is stable as a result of the friction between the outer surface of the heads 26 and the inner surface of the seats 24, without any need to use a fixing member between the heads 26 and the seats 24.

Moreover, owing to the presence of the ball joints 42, 44, small alignment errors between the seats can be compensated and a correct kinematic operation of the rotation is ensured, without requiring an excessive precision for execution of the prefabricated member.

This solution allows installation of the prefabricated bodies 12 on the respective support members 30 to be made simple and quick, by virtue of the fact that it only requires the engagement of the heads 26 of the supporting bodies into the seats 24 of each prefabricated body 12.

After having installed a body 12 on the support members 30 thereof, installation of the relevant moving actuator 50 can be performed.

In this manner, it is possible to install the concentrator mirrors of a plant 12 in an extremely simple and quick manner, by using a simple lifting crane during the installation step, which contributes to reduce the overall cost of installation of the plant 10.

The invention claimed is:

1. A structure of a concentrator mirror comprising a prefabricated body of reinforced concrete including an elongated panel member having a front surface adapted for receiving a reflective laminar layer, and a back surface opposite to said front surface, the panel member having a longitudinal hinge axis adapted to be rotatably mounted on a support structure, said prefabricated body being provided with a counterweight appendage that projects from the back surface of the panel member in a direction opposite to the panel front surface, wherein said panel member has a pair of coaxial hollow seats that are longitudinally spaced along said hinge axis and open in the said back surface, wherein said coaxial hollow seats are integrally formed with the panel member and which are shaped to receive respective support ball joints of said support structure, that jointly define said hinge axis, and wherein said counterweight appendage is formed integrally with the said panel member as a continuous linear rib projecting from said back surface of said panel member in the direction opposite to the panel front surface along a direction parallel to said hinge axis and extending between said coaxial hollow seats, so as to bring said hinge axis into a barycentric position of said body.

2. The structure of claim 1, wherein said counterweight appendage comprises an elongated ballast integrally connected to an end of the linear rib counterweight appendage opposite to the said panel member.

3. The structure of claim 1, wherein said counterweight appendage extends from the rear surface of the panel member for a length between ⅙ and ¼ of a chord of the panel member.

4. The structure of claim 1, wherein each of said hollow seats is shaped to allow a respective support member of said support structure, which is provided with a support ball joint, to be engaged directly in the seat by coupling said prefabricated body to the support structure from above.

5. The structure of claim 1, wherein said prefabricated body is provided, at a position intermediate between said seats and offset with respect to said hinge axis, with a formation adapted to be articulably engaged by a first end of a linear actuator serving to control an orientation of said prefabricated body about its hinge axis, in which the second end of said actuator is articulably connected to a respective foundation on which said support structure is fixed.

6. The structure of claim 1, wherein each of said hollow seats is shaped as to receive a head of an articulated joint of a respective support member of said support structure, which support member is fixed on a foundation which supports said prefabricated body through said support structure.

7. The structure of claim 6, wherein each support member comprises a pair of legs arranged according in a V-shaped configuration.

8. The structure of claim 7, wherein each of said legs includes a metal profiled section.

9. The structure of claim 6, wherein each of said head is swingably mounted on a ball joint supported by a respective support member.

10. The structure of claim 1, wherein said reflective laminar layer is connected to the front surface of said panel member by an adhesive material.

11. The structure of claim 1, wherein said reflective laminar layer is incorporated in said front surface upon forming said prefabricated body.

12. The structure of claim 1, wherein said reflective laminar layer is removably applied to said front surface, and the panel member is provided, along an axial side thereof, with a projection forming an abutment for retaining a corresponding side of the reflective laminar layer, and wherein an opposite side of the reflective laminar layer is fixed at the side of the panel member opposite the axial side by a series of removable clamp members.

13. The structure of claim 1, wherein said laminar layer comprises a series of superimposed and separable reflective sheets, whereby its reflective surface may be periodically renewed by removing an outermost sheet.

14. The structure of claim 1, wherein said laminar layer comprises a single reflective sheet arranged adjacent to said front surface of the panel member, and a transparent protective film applied on said reflective sheet.

15. A plant for power production from solar radiation, comprising a plurality of concentrator mirror structures as claimed in claim 1.

16. The structure of claim 12, wherein said laminar layer comprises a series of superimposed and separable reflective sheets, whereby its reflective surface may be periodically renewed by removing an outermost sheet.

17. The structure of claim 12, wherein said laminar layer comprises a single reflective sheet arranged adjacent to said front surface of the panel member, and a transparent protective film applied on said reflective sheet.

* * * * *